United States Patent [19]
Newby

[11] Patent Number: 5,466,534
[45] Date of Patent: Nov. 14, 1995

[54] METAL-POLYMER COMPOSITE INSULATIVE SPACER FOR GLASS MEMBERS AND INSULATIVE WINDOW CONTAINING SAME

[75] Inventor: Charles D. Newby, Bexley, Ohio

[73] Assignee: Crane Plastics Company Limited Partnership, Columbus, Ohio

[21] Appl. No.: 297,396

[22] Filed: Aug. 17, 1994

Related U.S. Application Data

[63] Continuation of Ser. No. 870,018, May 18, 1992, abandoned.

[51] Int. Cl.⁶ .............................. B32B 15/04; E06B 3/24
[52] U.S. Cl. .................... 428/457; 428/34; 428/35.8;
428/35.9; 428/36.6; 428/36.7; 428/167;
428/192; 428/461; 428/465; 428/522; 52/786.1
[58] Field of Search ................... 428/34, 68, 463,
428/457, 35.8, 35.9, 192, 39.6, 461, 36.1,
172, 36.7, 167, 121, 122, 522; 52/788,
790; 156/107, 109

[56] References Cited

U.S. PATENT DOCUMENTS

| | | | |
|---|---|---|---|
| 4,109,431 | 8/1978 | Mazzoni et al. | 428/34 |
| 4,222,213 | 11/1978 | Kessler | 52/790 |
| 4,658,553 | 7/1985 | Shinagawa | 52/172 |
| 4,788,088 | 10/1986 | Kohl | 428/34.5 |
| 4,831,799 | 11/1987 | Glover et al. | 52/172 |
| 5,079,054 | 11/1989 | Davies | 428/35.8 |
| 5,088,258 | 2/1992 | Scheid et al. | 52/788 |

*Primary Examiner*—Donald J. Loney
*Attorney, Agent, or Firm*—Standley & Gilcrest

[57] ABSTRACT

The present invention relates to an insulative spacer member for use between glass members, such as between panes of glass in a multiple glazed window. The present invention also relates to a multiple glazed window having at least one pair of adjacent glass panes separated by an insulative spacer in accordance with the present invention.

26 Claims, 2 Drawing Sheets

5,466,534

METAL-POLYMER COMPOSITE INSULATIVE SPACER FOR GLASS MEMBERS AND INSULATIVE WINDOW CONTAINING SAME

This is a continuation of application Ser. No. 07/870,018, filed May 18, 1992 entitled METAL-POLYMER COMPOSITE INSULATIVE SPACER FOR GLASS MEMBERS AND INSULATIVE WINDOW CONTAINING SAME, abandoned.

TECHNICAL FIELD

The present invention relates to an insulative spacer member for use between glass members, such as between panes of glass in a multiple glazed window. The present invention also relates to a multiple glazed window having at least one pair of adjacent glass panes separated by an insulative spacer in accordance with the present invention.

BACKGROUND

The present invention relates to the field of glass spacers, such as those applied in the area of prefabricated insulative multiple glazed windows and the like.

A critical requirement in modern building construction is energy conservation. A particular problem in view of the extensive use of glass in modern architecture is a loss of heat from the building through glass surfaces. One solution has been the increased use of insulating glass units, normally comprising at least two glass panes separated by a sealed dry air space. Sealed insulating glass units usually require some means precisely separating the two glass panels.

This leads to the conduction of heat from the interior glass plate to the exterior glass plate from where it is dissipated into the exterior environment. Further, there can result a differential dimensional change between the glass and the spacer, causing stress to develop on the glass and/or the seal which can result in damage to and the failure of the sealed glass unit.

There are several problems to be overcome in producing insulative multiple glazed windows wherein the panes are separated to form an insulative air space.

To provide the best insulative characteristics, the pane edges must be completely sealed to prevent communication between the air trapped between the glass panes, and the air in the environments on either side of the window (and/or in neighboring trapped air spaces in the case of windows having more than two glass panes). This has been traditionally done using a sealant material, such as a curable sealant adhesive, along the outside edges of the glass panes.

In order to best be able to produce a prefabricated multi-glazed window, it is necessary that the spacer be of substantially uniform thickness to maintain neighboring glass panes at correspondingly uniform distance from one another. This assures consistent sizing so that the balance of the window assembly can be predictably attached for installation.

Although the window spacer must restrict air flow, it must also prevent moisture from entering the trapped air space. If allowed in, moisture can condense inside the trapped air space, adversely affecting the translucence and appearance of the window. One common method of mitigating the effects of moisture has been to provide the spacer member with a desiccant material, such as silica gel, usually by placing the desiccant within a hollow spacer member, and providing small holes in the inside face of the spacer member to allow the desiccant to communicate with the trapped air space. While such an arrangement can reduce the effect of moisture in the trapped air space, the desiccants and the required machining of the spacer increase the cost of producing the window. Also, the amount of such desiccants in each window is limited by space constraints, and the desiccant cannot be regenerated in situ. Accordingly, desiccants have a limited capacity, and generally are normally exhausted after a few years of normal use, depending upon the ambient conditions.

One of the most serious and challenging problems in the production of window spacers is lack of insulative character in the spacer member itself. Typical spacers comprise hollow metal channels. Although they exclude moisture well, metals have high heat conductivity giving rise to the problem of low insulative character described above. In recent years, the insulative quality of window glass has increased to such an extent that the spacer member increasingly represents the weakest (i.e. most heat transmissive) portion of a multi-glazed window. The industry now recognizes that the spacer now accounts for a substantial portion of the total heat loss through an assembled multi-glazed window.

Metal spacers generally have expansion coefficients which differ from the glass and the sealant material. Also, because the metal/glass interface is difficult to seal, moisture can enter the trapped air space through this avenue.

There have been some attempts to use spacers made of polyvinylchloride rather than metal. This has, however been unsuccessful because the sealants which have been developed to construct reliable units bond well to glass and metal spacers, but not to polyvinylchloride spacers. This leads to structural weaknesses in units constructed with PVC spacers. Furthermore, the differential dimensional change that occurs between glass and PVC spacers over a certain range of temperature is much higher than with a metal spacer. In addition, most plastics have been found unacceptable for use between glass panes because they give off volatile materials, e.g. plasticizers, which can cloud or fog the interior glass surface.

The prior art shows some examples of the use of plastic over core material, but the details of construction and environment differ from the present invention. For example, U.S. Pat. No. 3,694,965 shows a wooden mullion element covered with a plastic extrusion, but this is not a spacer for double insulated glass. U.S. Pat. No. 3,070,854 shows a plastic channel member provided to cover a wooden separator between a pair of glass panes and U.S. Pat. No. 2,239,517 shows a metal separator provided with a plastic coating used in window construction.

U.S. Pat. No. 3,918,231 shows an extruded plastic element for fitting over a metallic frame element. U.S. Pat. No. 3,261,139 discloses a multiple glazed unit having a pair of resilient tape elements keyed to groves in the separator. U.S. Pat. No. 3,012,642 relates to window structures using very complex pane-holding elements. Canadian Patent No. 953,159 shows a double plated panel with a tubular spacer held in place by a non-hardening flow adhesive. German Offenlegungsschrift No. 1 434 283 also shows a spacer for double insulated glass.

U.S. Pat. No. 4,222,213 discloses an insulating spacer comprising an extruded or rolled-formed spacer together with a metal spacer together with a plastic insulating element which thermally insulates the metal spacer from the panes of glass while permitting conventional application of a sealant to provide reliable bonding. In one embodiment, the plastic insulator comprises an extruded plastic overlay which fits tightly over part of a conventional metal spacer. This patent discloses the incorporation of a metal spacer having portions for contacting in the sealant to provide a solid bond between the glass plate and the metal spacer. The spacer also incorporates a plastic insulator element to prevent any direct glass-to-metal spacer contact allowing only minimum contact with the glass plate to reduce heat conduction between the plates, while functioning as a spacer to keep the two glass plates at a measured distance during construction of a sealed window unit. However, the spacer taught by this patent is held mechanically affixed by contact pressure and/or friction. This patent teaches that this friction should not be so great that longitudinal shrinkage and expansion cannot occur with change in temperature due to different coefficients of expansion of the metal and plastic. This patent also teaches that some type of adhesive, such as EVA adhesive, could be used to insure permanent contact between the polymer and metal elements. However, this alternative is not preferred since it introduces the possibility of glass fogging, even when only small quantities of adhesive are used.

The '233 patent also teaches that many common extrudable plastics, such as PVC are not suitable for application in the disclosed spacer because they cause fogging of the glass.

Most recently, U.S. Pat. No. 5,088,258 disclosed an insulating spacer assembly comprising an extruded or rolled-formed hollow metal spacer together with thermal breaks and primary sealant. The spacer and thermal brakes may be coextruded together. However, this patent fails to teach the formation of a metal-polymer composite through the use of a heat-activated adhesive, as is done in the present invention.

U.S. Pat. Nos. 4,222,213 and 5,088,258 are hereby incorporated herein by reference.

The present invention represents an improvement over the prior art in that it allows for the use of a metal-polymer composite as a glass spacer while eliminating both concerns over differential expansion between the metal component and the polymer component, and the potential for fogging of the glass brought about by volatiles where adhesives are used.

The present invention also eliminates a concern over the use of extrudable polymers which normally would be unsuitable because they can give off volatiles, such as plasticizers.

The present invention therefore provides a glass spacer having precise and predictable dimensional characteristics, and excellent thermal insulative qualities. The present invention also eliminates concerns over fogging caused by volatiles in the polymer or the adhesive used to bond the polymer to the metal spacer substrate. The glass spacer of the present invention also provides an excellent barrier against air and moisture to prevent fogging or accelerated degradation of the spacer seal.

SUMMARY OF THE INVENTION

The present invention includes an insulative spacer for use in between two glass members, and an insulative multi-glazed window containing such an insulative spacer between at least two of its glass panes.

In broadest terms, the insulative spacer of the present invention comprises a metal-polymer composite adapted to fit between two glass members, such as along the edge of two adjacent glass panes.

The metal substrate portion of the composite may be formed in accordance with know methods of producing conventional metal spacers, such as by extrusion. The metal substrate is normally of aluminum, but may be made of any other equivalent metal or alloy commonly used in the art, such as electrogalvanized steel, stainless steel, and the like. The metal substrate is normally extruded into a hollow rod shaped so as to fit between the glass members, such as along the edge of two glass panes. A commonly preferred embodiment is to provide the hollow rod with a quantity of a desiccant material, with the spacer ventilated into the sealed air space to allow the desiccant to absorb moisture from the sealed space.

The metal-polymer composite is formed by extruding a polymer coating over the metal substrate in the presence of a heat-activated adhesive which bonds the polymer to the metal substrate during the extrusion process. It is preferred that the coating polymer cover substantially the entire inner surface of the metal substrate, i.e. that surface facing into the sealed air space. Such an arrangement helps to seal the inter-glass space from any residual volatiles in the heat-activated adhesive. Most preferably, the coating polymer covers the entire outer surface of the metal substrate. The extruded polymer coating is shaped so as to present an appropriate architecture to fit snugly between the glass members, as shown for instance in the accompanying Figures.

Suitable polymers may include any extrudable polymer including polyvinylchloride, chloropolyvinylchlorides and other polymers which may be amendable to compositing extrusion with an appropriate heat-activated adhesive. A specific example of such a suitable polymer is a low- or non-plasticized PVC, such as rigid PVC No. 85857, commercially available from B. F. Goodrich Company of Akron, Ohio. Although not a limitation to the present invention, typical coating polymer thicknesses may be in the range of from 1 to 40 mils, typically 20 mils. The polymer may be provided with a pigment suitable to use in the selected polymer, as is known in the art.

The heat-activated adhesive may be selected from any adhesives appropriate to bind the desired metal-polymer combination to form a composite. Examples include heat-activated adhesives of the class commonly referred to as plastisol primers, such as those commercially available for instance from B.F. Goodrich Company of Akron, Ohio. For instance, where the metal substrate is aluminum a polymer extrudate coating is polyvinylchloride, an appropriate heat-activated adhesive may be plastisol primer A 1104-B or A 1167-B commercially available from B.F. Goodrich Company of Akron, Ohio, or plastisol primer AX51250, commercially available from Ashland Chemical Company of Columbus, Ohio. The heat-activated adhesive may be applied to the metal substrate either during the coextrusion process; or the metal substrate may be prepared with a layer of the adhesive prior use in the coextrusion process. A typical dry thickness for the heat-activated adhesive is in the range of 0.2 to 0.4 mil, though not a limitation to the practice of the invention.

The metal-polymer composite is shaped so as to present at least three surfaces: an inner surface adapted to face toward the inside of the sealed air space in the multi-glazed window, and two engagement surfaces adapted respectively to engage the two glass member inner surfaces. Preferably, the polymer also coats the fourth surface, i.e. the surface facing outwardly from between the inner surface of the two glass members. In an alternative embodiment, the polymer may be made to coat only the two engagement surfaces.

Examples of such alternatives are shown in the accompanying figures.

In a preferred embodiment, the inner surface may be coated with a layer of at least one fluoropolymer. This layer may be coextruded with the compositing polymer layer in accordance with commonly used methods, such as by using a side extruder. The fluoropolymer may also contain a pigment chosen from any of those commonly available and appropriate for use in fluoropolymers.

The present invention also includes a multi-glazed window assembly wherein at least one adjacent pair of glass panes is provided with an insulative spacer according to the present invention.

By forming a metal-polymer composite in this way, one of the advantages of the tight bond between the polymer and the metal allows the metal to overcome the difference in linear expansion coefficients so that the metal polymer composites exhibits expansion behavior similar to that of the metal substrate alone; i.e. as a single material.

The metal-polymer composites of the present invention may be formed by coextrusion of the coating polymer over the metal substrate in accordance with commonly accepted coextrusion practices. For instance, the coating polymer may be coextruded over an aluminum substrate at a temperature in the range of about 300° F. to about 400° F. This may be done using commercially available extrusion equipment such as common single- or multiple-screw extruders such as those commercially available from Cincinnati Milacron. The optional layer of fluoropolymer may also be coextruded as part of the metal-polymer composite using a side extruder, for instance.

The present invention also includes a multi-glazed window assembly wherein at least one adjacent pair of glass panes are provided with an insulative spacer in accordance with the present invention. Such a window may be assembled in accordance with methods and materials known in the prefabricated window art, as exemplified in the accompanying figures. Due to the nature of the finished metal-polymer spacer, it is preferred that the spacer extrudate be installed by cutting it to size and jointing it at intersections rather than by attempting to bend the spacer of the present invention.

DETAILED DESCRIPTION OF THE PREFERRED EMBODIMENTS

The following presents a preferred embodiment of the present invention which is presently considered to be the best mode contemplated for use as an insulative window pane spacer and an insulative window containing such a spacer.

Figure 1:
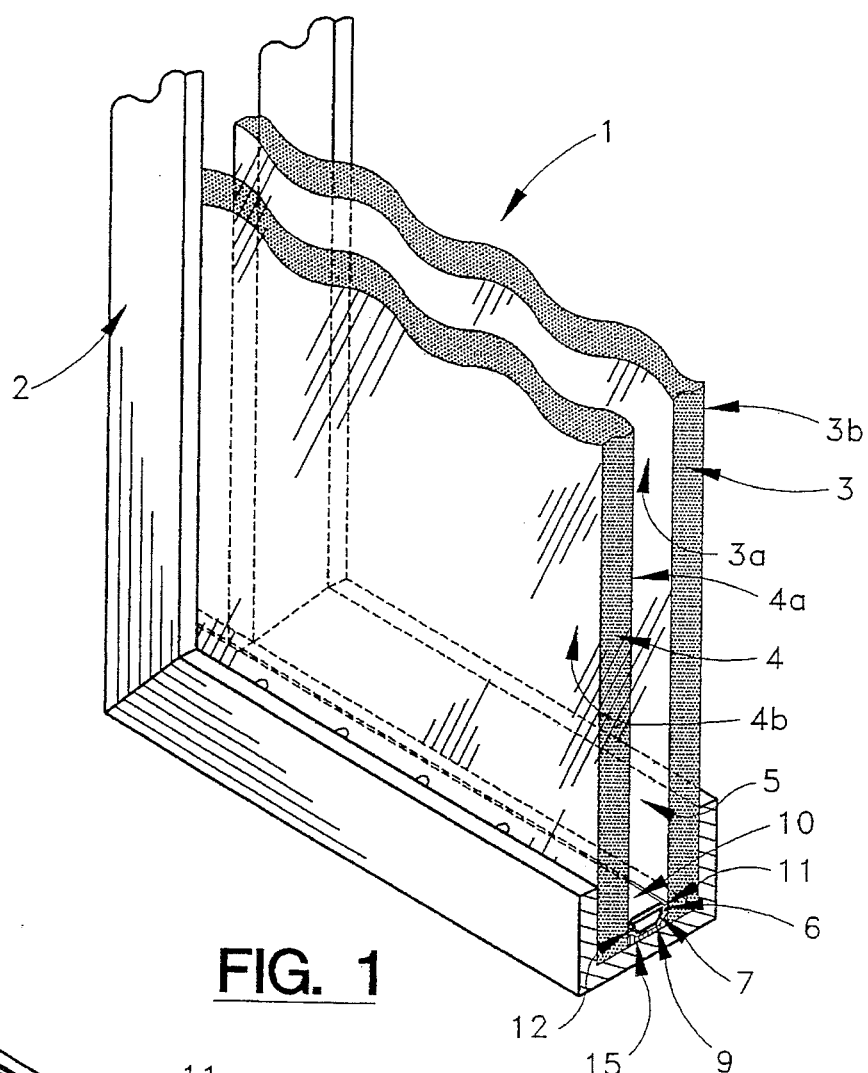
FIG. 1 is a prospective view of a sectioned dual pane window containing an insulative spacer in accordance with one embodiment of the present invention.

Turning to the Figures, FIG. 1 shows insulative window 1 which is constructed from window frame 2 and glass panes 3 and 4. Glass pane 3 has inner surface 3a and outer surface 3b. Glass pane 4 has inner surface 4a and outer surface 4b together with the insulative spacer member 6. Glass panes 3 and 4 enclosed seal air space 5. Insulative spacer member 6 is a metal-polymer composite comprising metal substrate member 7 and polymer coating 8. The insulative spacer member presents outer surface 9 (facing away from sealed airspace 5), inner surface 10 (facing toward sealed inner space 5), and engagement surfaces 11 and 12 which respectively sealingly engage inner surfaces 3a and 4a.

Figure 2:
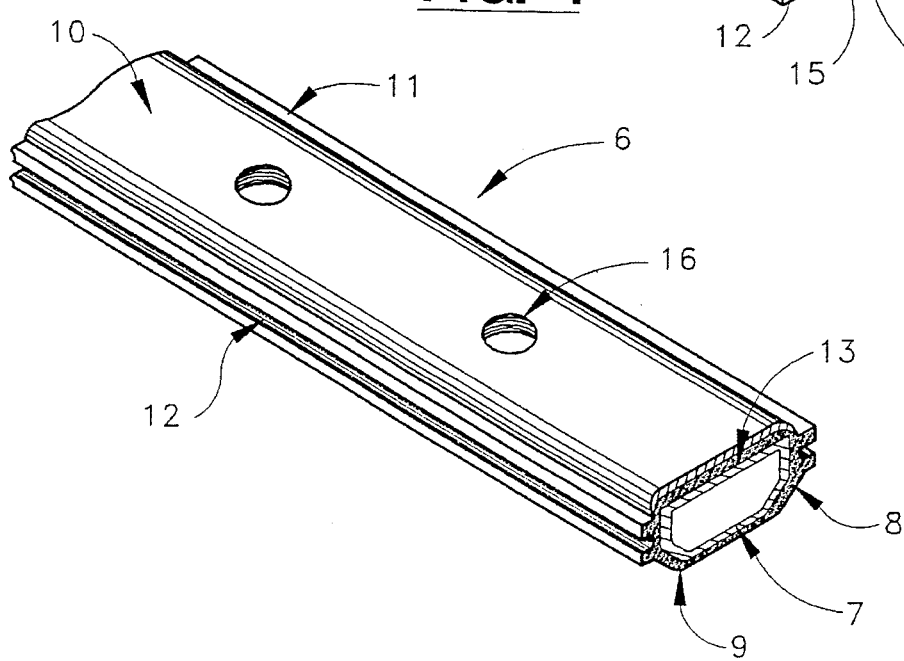
FIG. 2 is a section prospective view of an insulative spacer in accordance with one embodiment of the present invention.

FIG. 2 is a sectioned prospective view of a length of an insulative spacer member 6. This view shows metal substrate 7 and polymer coating 8, between which resides a thin adhesive inner face formed by the heat-activated adhesive. FIG. 2 shows outer surface 9, inner surface 10 and engagement surfaces 11 and 12. Also shown in FIG. 2 is the optional fluoropolymer layer disposed on inner surface 10.

Figure 3:
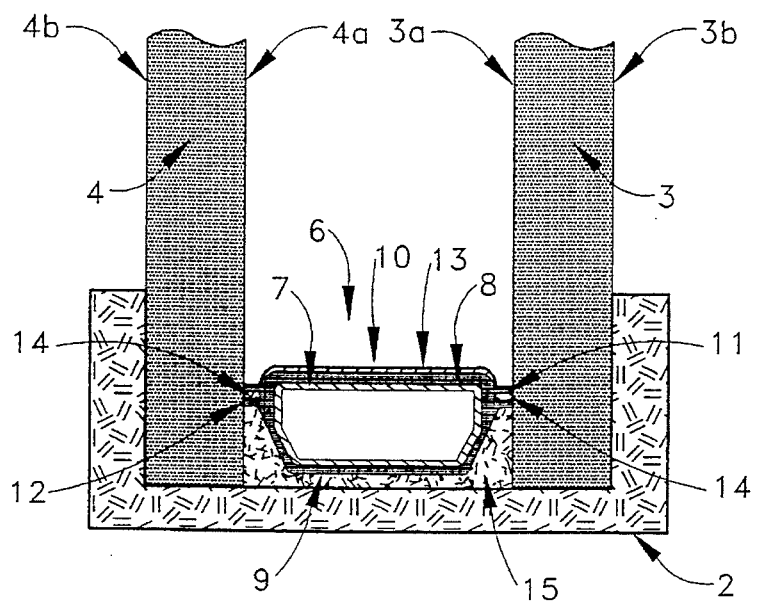
FIG. 3 is a cross section view of an insulative spacer in accordance with one embodiment of the present invention.

Turning to FIG. 3, insulative spacer member 6 is shown in cross section as it would appear disposed between glass pane 3 (having inner surface 3a and outer surface 3b) and glass pane 4 (having inner surface 4a and outer surface 4b). FIG. 3 also shows the metal substrate portion 7 and the polymer coating 8 which is formed into a metal-polymer composite by a heat-activated adhesive at the inter face between the two. Insulative spacer member 6 is shown having outer surface 9 which may be sealed with a layer of a conventional sealant 15 (such as a silicone sealant). Inner surface 10 of insulative spacer member 6 is also shown on having disposed thereupon optional fluoropolymer layer 13. The finished inner surface may be provided with small apertures 16 to allow the sealed air space to allow the space to communicate with the hollow center of the spacer where it is provided with a desiccant. Engagement surfaces 11 and 12 are shown as having a conventional two-prong cross sectional shape so as to engage inner surfaces 3a and 4a, respectively. Between the two prongs is disposed a moisture barrier material 14 (such as a polyisobutylene material) which supplements the air barrier characteristics of the sealant 15.

FIGS. 4 through 7 show alternative embodiments of the present invention, although the best mode of the present invention is currently thought to be that shown in FIGS. 1 through 3.

Figure 4:
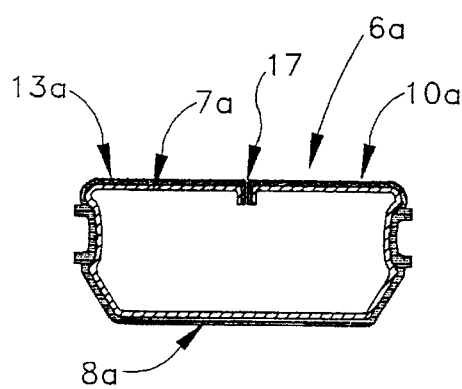
FIGS. 4–7 are cross-section views of other insulative spacers in accordance with other embodiments of the present invention.

FIG. 4 shows an alternative architecture of an insulative spacer member 6a. Insulative spacer member 6a is shown as having corresponding metal substrate portion 7a, polymer coating 8a and optional fluoropolymer layer 13a. Also shown in FIG. 4 is an aspect of the spacer architecture that can be applied to any of the embodiments shown in FIGS. 3 through 6. Such feature is a small slot 17 formed along upper surface 10a by the splitting and turning in of the metal substrate 7a and the coating polymer 13a. This alternative architecture also allows for communication between the sealed air space and the hollow interior of the spacer member so that a desiccant may be used in the interior of the spacer member.

Figure 5:
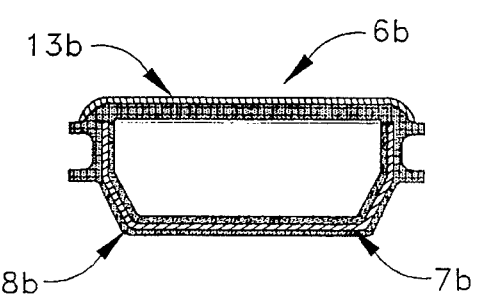

FIG. 5 shows insulative spacer member 6b having an alternative architecture and comprising metal substrate portion 7b, polymer coating 8b and optional fluoropolymer layer 13b.

Figures 6, 7:
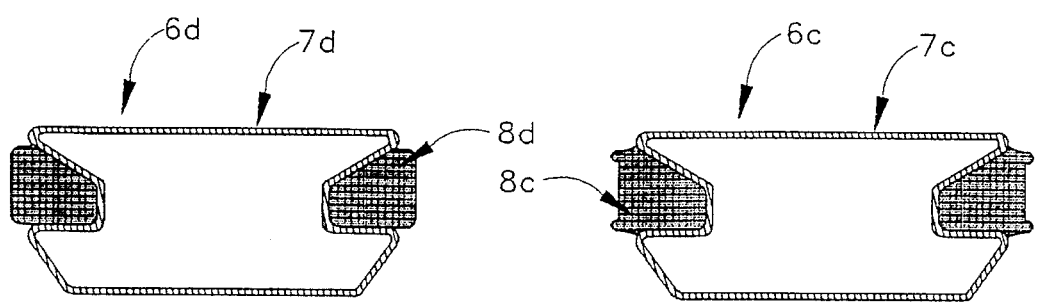

FIG. 6 shows yet another insulative spacer member 6c exemplifying yet another spacer architecture and comprising corresponding metal substrate portion 7c and polymer coating 8c.

FIG. 7 shows insulative spacer member 6d which shows another spacer architecture, and comprises a corresponding metal substrate portion 7d and polymer coating 8d.

In view of the foregoing disclosure, it will be possible for one of ordinary skill in the art to make modifications and alterations to, and variations in the present invention, including the substitution of the equivalent materials, parts and there arrangement without departing from the spirit of the present invention as reflected in the disclosure and the appended claims.

What is claimed:

1. A spacer member for use between two glass members, said spacer member comprising a metal-polymer composite, said composite comprising:
   (i) a metal substrate; and
   (ii) a polymer disposed on said metal substrate and adhered to said metal substrate with a heat-activated adhesive so as to form said metal-polymer composite, said polymer selected from the group consisting of polyvinylchlorides and chloropolyvinylchlorides.

2. A spacer member according to claim 1 wherein said metal substrate comprises a metal selected from the group consisting of aluminum, stainless steel and electrogalvinized steel.

3. A spacer member according to claim 1 wherein said heat-activated adhesive is a plastisol primer.

4. A spacer member for sealing the edges of two glass panes in a multi-glazed window so as to seal a closed spacer between said glass panes and said spacer member, said spacer member having an inner surface for facing said closed space, an outer surface for facing outside said closed space, an outer surface for facing outside said closed space, and two engagement surfaces respectively for engaging each of said glass panes, said spacer member comprising:
   a metal-polymer composite, said composite comprising:
   (i) a metal substrate; and
   (ii) a polymer disposed on said metal substrate and adhered to said metal substrate with a heat activated adhesive so as to form said metal-polymer composite;
   at least said inner surface and said engagement surfaces provided with a layer of said polymer, said polymer selected from the group consisting of polyvinylchlorides and chloropolyvinylchlorides.

5. A spacer member according to claim 4 wherein said polymer covers substantially all of said inner surface.

6. A spacer member according to claim 5 wherein said polymer on said inner surface is provided with a layer of at least one fluoropolymer disposed over said polymer on said inner surface.

7. A multi-glazed window comprising at least two adjacent glass panes, at least one adjacent pair of said glass panes having disposed therebetween a spacer member according to claim 1.

8. A multi-glazed window comprising at least two adjacent glass panes, at least one adjacent pair of said glass panes having disposed therebetween a spacer member according to claim 2.

9. A multi-glazed window comprising at least two adjacent glass panes, at least one adjacent pair of said glass panes having disposed therebetween a spacer member according to claim 3.

10. A multi-glazed window comprising at least two adjacent glass panes, at least one adjacent pair of said glass panes having disposed therebetween a spacer member according to claim 4.

11. A multi-glazed window comprising at least two adjacent glass panes, at least one adjacent pair of said glass panes having disposed therebetween a spacer member according to claim 5.

12. A multi-glazed window comprising at least two adjacent glass panes, at least one adjacent pair of said glass panes having disposed therebetween a spacer member according to claim 6.

13. A spacer member according to claim 1 wherein said metal-polymer composite additionally comprises a layer of a fluoropolymer disposed on said polymer.

14. A spacer member according to claim 4 wherein said outer surface is provided with a layer of said polymer.

15. A spacer member according to claim 4 wherein said polymer on each of said engagement surfaces forms at least one groove running longitudinally along each said engagement surface.

16. A multi-glazed window comprising at least two adjacent glass panes, at least one adjacent pair of said glass panes having disposed therebetween a spacer member according to claim 13.

17. A multi-glazed window comprising at least two adjacent glass panes, at least one adjacent pair of said glass panes having disposed therebetween a spacer member according to claim 14.

18. A multi-glazed window comprising at least two adjacent glass panes, at least one adjacent pair of said glass panes having disposed therebetween a spacer member according to claim 15.

19. A spacer member according to claim 4 wherein said heat-activated adhesive is a plastisol primer.

20. A spacer member for sealing the edges of two glass panes in a multi-glazed window so as to seal a closed space between said glass panes and said spacer member, said spacer member having an inner surface for facing said closed space, an outer surface for facing outside said closed space, and two engagement surfaces respectively for engaging each of said glass panes, said spacer member comprising:
   a metal-polymer composite, said composite comprising:
   (i) a metal substrate; and
   (ii) a polymer disposed on said metal substrate and adhered to said metal substrate with a heat activated adhesive so as to form said metal-polymer composite;
   at least said inner surface and said engagement surfaces provided with a layer of said polymer, said polymer selected from the group consisting of polyvinylchlorides and chloropolyvinylchlorides, and at least said polymer disposed on said inner surface provided with a layer of a fluoropolymer.

21. A spacer member according to claim 20 wherein said outer surface in provided with a layer of said polymer.

22. A spacer member according to claim 20 wherein said polymer on each of said engagement surfaces forms at least one groove running longitudinally along each said engagement surface.

23. A multi-glazed window comprising at least two adjacent glass panes, at least one adjacent pair of said glass panes having disposed therebetween a spacer member according to claim 19.

24. A multi-glazed window comprising at least two adjacent glass panes, at least one adjacent pair of said glass panes having disposed therebetween a spacer member according to claim 20.

25. A multi-glazed window comprising at least two adjacent glass panes, at least one adjacent pair of said glass panes having disposed therebetween a spacer member according to claim 21.

26. A multi-glazed window comprising at least two adjacent glass panes, at least one adjacent pair of said glass panes having disposed therebetween a spacer member according to claim 22.

\* \* \* \* \*